(12) United States Patent
Baker et al.

(10) Patent No.: US 6,863,351 B2
(45) Date of Patent: Mar. 8, 2005

(54) BI-DIRECTIONAL AUTONOMOUS TRUCK

(75) Inventors: Mark R. Baker, Tucson, AZ (US); Randall J. Omdahl, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 10/454,251

(22) Filed: Jun. 3, 2003

(65) Prior Publication Data

US 2003/0193234 A1 Oct. 16, 2003

Related U.S. Application Data

(62) Division of application No. 10/047,645, filed on Jan. 15, 2002, now Pat. No. 6,578,925.

(51) Int. Cl.[7] .................................................. B60P 1/23
(52) U.S. Cl. .......................... 298/17.6; 298/17.5; 298/7; 180/167
(58) Field of Search .......................... 298/7, 17.5, 17.6, 298/22 R; 180/167, 342, 343, 371

(56) References Cited

U.S. PATENT DOCUMENTS

| | | |
|---|---|---|
| 3,599,819 A | 8/1971 | Leijon |
| 3,964,791 A | 6/1976 | Griffis |
| 4,141,591 A | 2/1979 | Spicer |
| 4,531,780 A | 7/1985 | Boczkiewicz |
| 4,568,028 A | 2/1986 | Verseef et al. |
| 5,906,417 A | 5/1999 | Golden |
| 6,108,597 A | 8/2000 | Kirchner et al. |
| 6,113,194 A | 9/2000 | Neufeld |
| 6,321,147 B1 | 11/2001 | Takeda et al. |
| 6,454,036 B1 | 9/2002 | Airey et al. |
| 6,578,925 B1 * | 6/2003 | Baker et al. ............... 298/17.6 |

* cited by examiner

Primary Examiner—Stephen Gordon
(74) Attorney, Agent, or Firm—Quarles & Brady Streich Lang LLP

(57) ABSTRACT

A bi-directional autonomous truck. The truck includes a drive-train including one or more drive wheels, the drive-train having drive characteristics that are substantially the same whether the drive wheels rotate clockwise or counter-clockwise. The drive characteristics may consist of the ability to reach a maximum rotational speed of the drive wheels, but may include other characteristics, such as the ability to steer corresponding pairs of drive wheels that are situated at opposite ends of the truck. Preferably, the truck includes a dump bed that is adapted for dumping in either of two opposite directions.

8 Claims, 4 Drawing Sheets

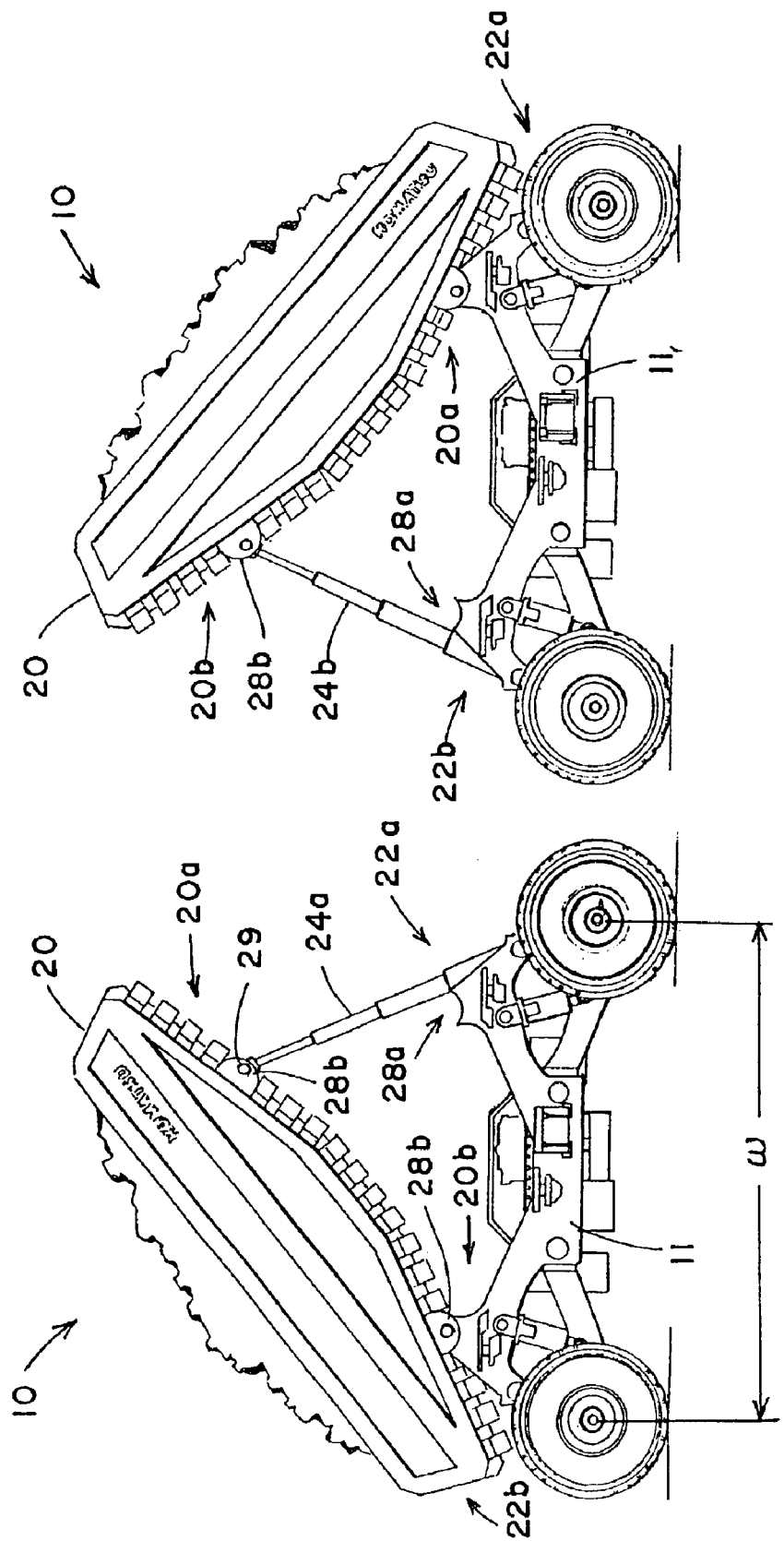

BI-DIRECTIONAL AUTONOMOUS TRUCK

RELATED APPLICATION

This application is a divisional application of U.S. Ser. No. 10/047,645, filed Jan. 15, 2002, now U.S. Pat. No. 6,578,925, issued Jun. 14, 2003.

BACKGROUND OF THE INVENTION

The present invention relates to a bi-directional autonomous truck, particularly a dump truck for use in surface mining operations that is adapted for being driven in two opposite directions with substantially equal facility.

Mining operations typically employ very large dump trucks, e.g., having a capacity of hundreds of tons, for receiving excavated earth at a mining face or loading point, transporting the earth to a point of processing or deposit, dumping the earth, and returning to the loading point. As the technology has advanced, these trucks have more frequently been provided in so-called "autonomous," form, meaning that they are remotely controlled; however, where such a truck would include a cabin for housing an operator, the cabin is typically biased toward one end of the truck, with the dump bed of the truck being biased toward the other end of the truck.

The trucks may be powered directly by a diesel or other combustion engine through a gear train, or by such an engine driving a generator for powering one or more electric motors located at respective wheels. For a truck powered directly by a combustion engine, a plurality of forward gears are provided in order to permit the engine to remain within an efficient range of engine speeds over a wide range of road speeds. On the other hand, backing-up is typically done at low speed, so that only a single reverse gear is provided for this purpose.

Where one or more wheels of the truck are powered by respective electric motors, the motors may be AC or DC. Analogous to the combustion engine, motor speed is varied in the forward directions by varying the current to or voltage across the motors, with a plurality of voltage or current settings which may be discrete or continuous, but motor speed is intentionally limited by a governing device in reverse.

In use, the truck is driven from point A to point B, where point A may be a loading point or source of earth that has been excavated and point B may be a location for depositing the excavated earth that is some distance away from point A. For traveling between points A and B, it is desirable to use the forward gears of the truck, so that the distance is traversed most efficiently. Accordingly, the truck must be turned around at each point. This may be done with the forward gears only, but at the expense of utilizing a relatively large amount of space corresponding to the turning circle of the truck. Typically, however, it is done by using the reverse gear, though this takes additional time and effort as well, and either option complicates the logistics of the mining operation where there are multiple instances of the truck operating in the same area.

Accordingly, there is a need for a bi-directional autonomous truck that provides substantially the same drive-characteristics in two opposite directions, to minimize or eliminate the need to turn the truck around.

SUMMARY OF THE INVENTION

The bi-directional autonomous truck of the present invention meets the aforementioned need by providing, in an autonomous dump truck, a drive-train including one or more drive wheels, the drive-train having drive characteristics that are substantially the same whether the drive wheels rotate clockwise or counterclockwise. The drive characteristics may consist of the ability to reach a maximum rotational speed of the drive wheels, but may include other characteristics, such as the ability to steer corresponding pairs of drive wheels that are situated at opposite ends of the truck.

Preferably, the truck includes a dump bed that is adapted for dumping in either of two opposite directions.

More preferably, the dump bed of the truck is arranged to be substantially symmetric about a plane perpendicular to the direction of forward and reverse travel of the truck.

Still more preferably, the truck is substantially symmetric about a plane perpendicular to the direction of forward and reverse travel of the truck.

Therefore, it is a principal object of the present invention to provide a bi-directional autonomous truck.

It is a further object of the present invention to provide such a truck that provides substantially the same drive-characteristics in two opposite directions, to minimize or eliminate the need to turn the truck around.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 4A is a side elevation of the truck of FIG. 1, showing a dump bed in a position for dumping in one direction according to the present invention.

FIG. 4B is a side elevation corresponding to FIG. 4A, wherein the dump bed is shown in a position for dumping in the other direction according to the present invention.

DETAILED DESCRIPTION OF A PREFERRED EMBODIMENT

"Autonomous" vehicles are controlled by remotely tracking the position and status of the vehicles and issuing commands by wireless communication with one or more of the vehicle's on-board computers. Examples of relevant vehicle status information are the steering angle of the steering wheels of the vehicle, the amount of throttle, voltage or current provided to the engine or motor, and the amount of brake being applied to the wheels.

Prior art autonomous vehicles have retained many of the characteristics of manned vehicles, and in particular, they have retained the characteristics of their drive-trains. For a combustion engine driven vehicle, the engine drives the driving wheels through a transmission that makes available a range of engine speeds for a selected rotational speed of the wheels that corresponds to forward movement of the vehicle. These speeds are be provided by a plurality of gears. For an electric motor driven vehicle, the motor is driven by electrical current supplied by a generator that is typically powered by a combustion engine. A control system prevents the motor from achieving the same maximum rotational speeds in forward or reverse directions of the vehicle; particularly, the maximum motor and therefore vehicle speed in reverse is limited by the control system since the vehicle is typically not used to back up at high speed.

Either way, a wider range of engine or motor speeds is made available for driving the driving wheels in the direction of wheel rotation corresponding to the forward direction of the vehicle than has been provided for the direction of wheel rotation corresponding to the opposite direction. This distinction between forward and reverse movement of the vehicle has historically been of practical value because it is difficult for an on-board human driver to see and therefore to drive the truck at high speed in the reverse direction, and this is especially the case for a loaded dump truck.

However, the present inventors have recognized that where the vehicle is autonomous, there is no longer a need to distinguish between the forward and reverse directions, and in addition, there are benefits to discarding this distinction. This insight has permitted the inventors to arrive at the concept of a bi-directional autonomous truck that is adapted to be driven in either forward or reverse direction with substantially equal facility.

Figure 1:
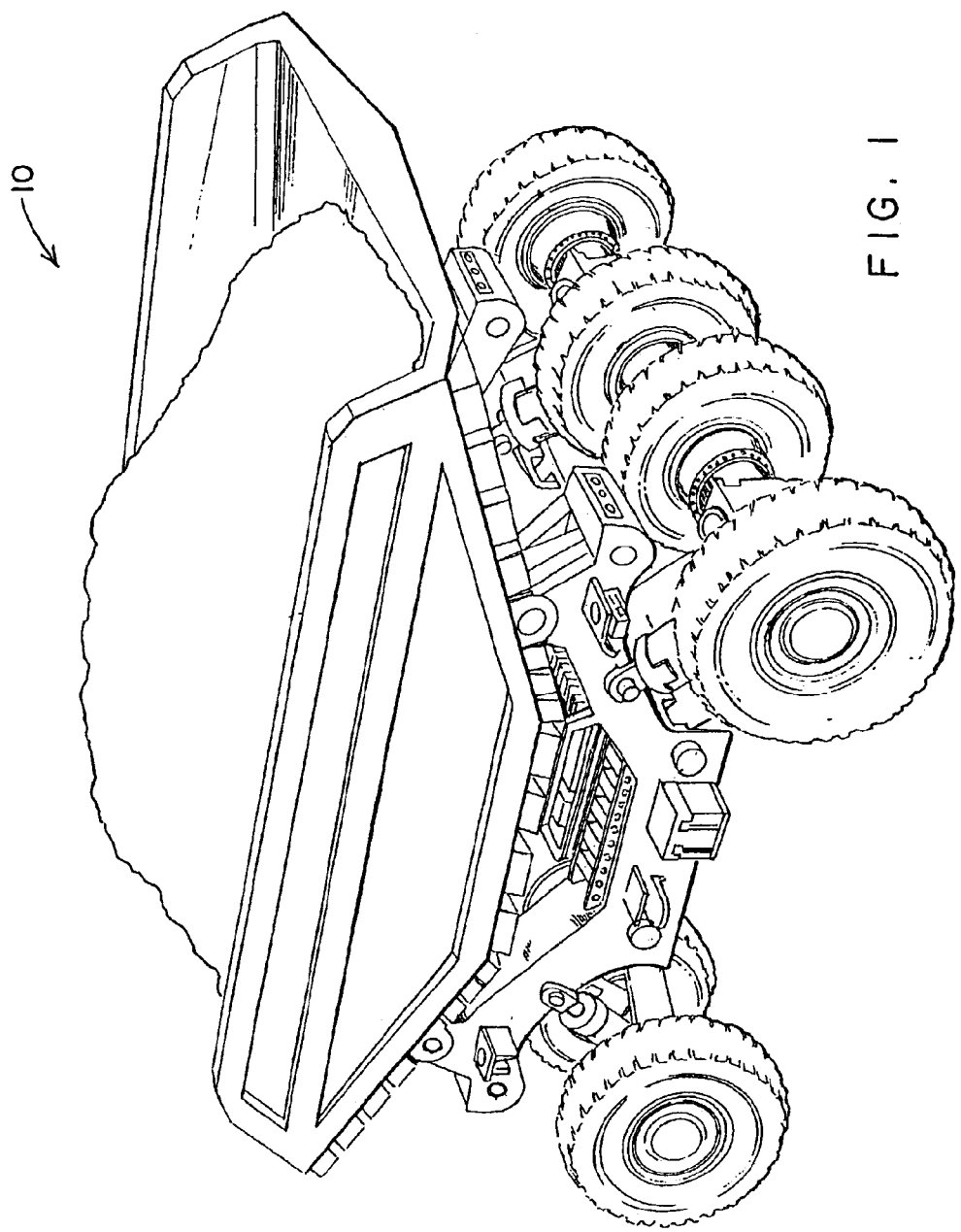
FIG. 1 is a pictorial view of a bi-directional autonomous truck according to the present invention.
Figure 2:
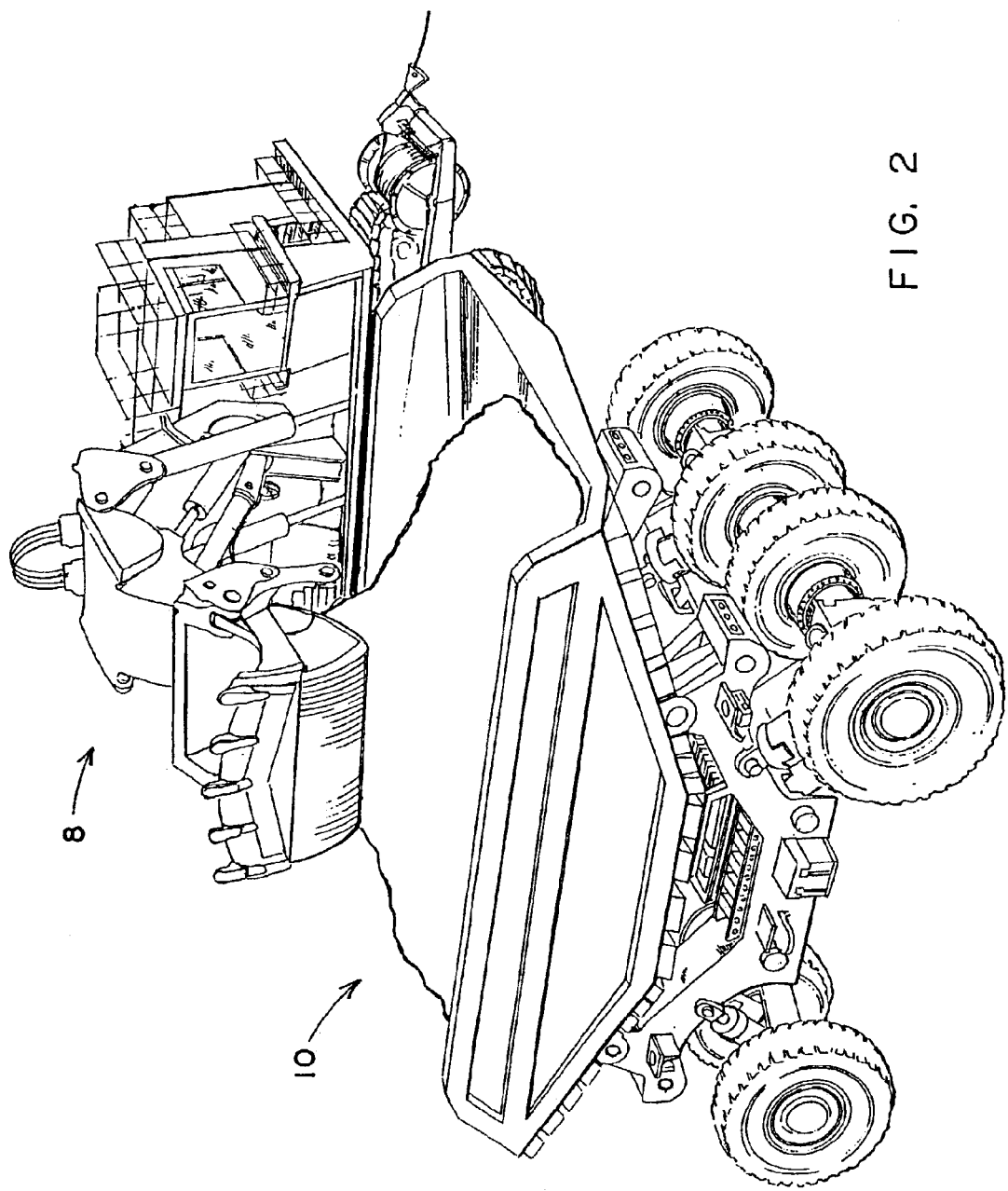
FIG. 2 is a pictorial view of the truck of FIG. 1 being loaded with excavated earth.
Figure 3:
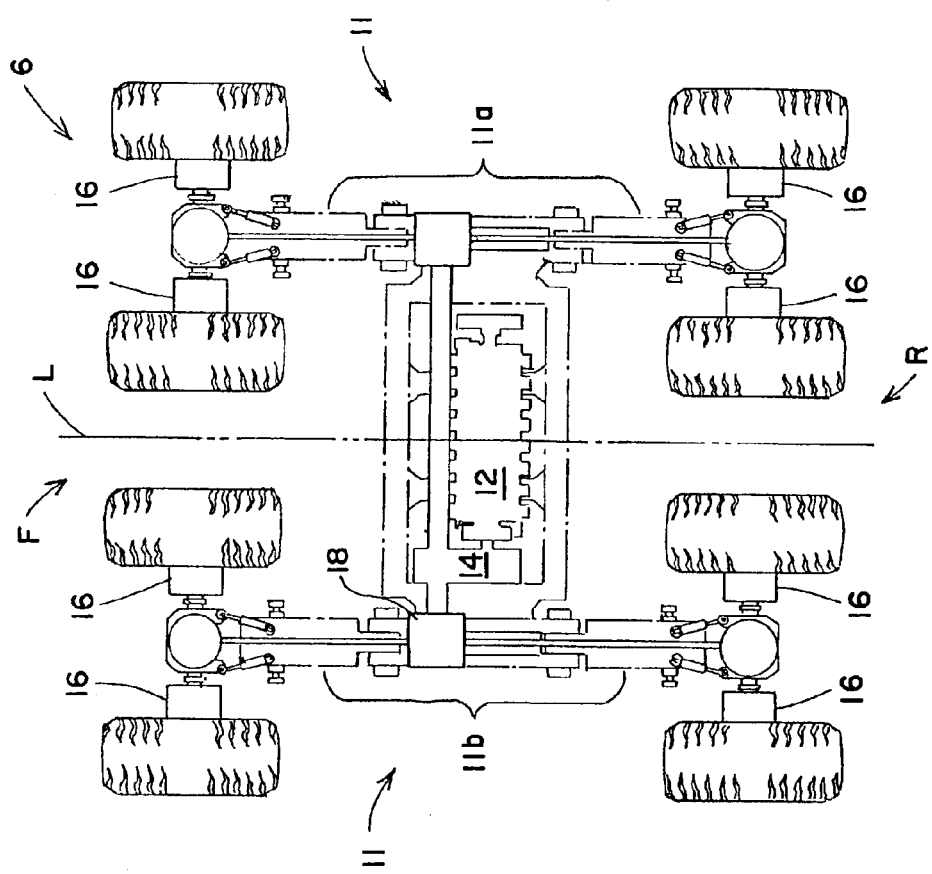
FIG. 3 is a plan view of a chassis of the truck of FIG. 1 according to the present invention.

Referring to FIG. 1, a bi-directional autonomous truck 10 according to the present invention is shown. FIG. 2 shows the truck 10 being loaded with excavated earth by an excavating machine 8. FIG. 3 shows the drive-train 6 for the truck 10 in plan. The drive-train has a longitudinal axis "L" that defines front "F" and rear "R" ends of the truck, corresponding to forward and reverse directions of movement. The drive-train is mounted to a truck chassis 11, which may comprise a number of substantially identical frames 11a and 11b ganged together as shown to provide the required weight-carrying capability.

FIG. 3 is generic in that it shows a drive-train structure that may correspond to either a truck driven directly by a combustion engine 12, or a truck driven by one or more electric motors 16 which are provided electric power by a generator 14 that may be driven by the engine 12. Where the truck is driven directly by the engine 12, it also includes a mechanical transmission 18.

The transmission 18 conventionally includes a plurality of distinct forward gears, providing a corresponding plurality of ratios $R_{F1}, R_{F2}, \ldots R_{FN}$ of engine rotation speed to wheel rotation speed in one direction. Typically, there are three such forward gears, with distinct ratios $R_F$ that are larger than one, i.e., for one revolution of the driving wheels, the engine turns more than a single revolution. According to the invention, the transmission 18 also includes a plurality of distinct reverse gears, providing a corresponding plurality of ratios $R_{R1}, R_{R2}, \ldots R_{RM}$ of engine rotation speed to wheel rotation speed in the opposite direction. Preferably, M=K, so that there are an equal number of forward and reverse gears, and more preferably still, the ratios corresponding to forward and reverse movement are the same, i.e., $R_{F1}=R_{R1}$, $R_{F2}=R_{R2}$, etc. However, all that is required to realize an advantage over the prior art in this regard is that there are at least two discrete reverse gears, wherein one of the reverse gears has a lower ratio R than the reverse gear ratios currently being provided in such trucks. Structural implementation of the additional reverse gear or gears may be entirely conventional so that further detail is omitted as not being particularly pertinent to the invention.

In the case of a truck driven directly by one or more electric motors, the truck includes a control system 19 (not shown) which conventionally includes a plurality of forward voltage or current ("power") settings. The power settings may form a continuous band or may be discrete values, and may be implemented in a variety of ways, such as by controlling the throttle position of the generator, or a variable transformer, or by switching or otherwise controlling a variable power supply, which may be a simple voltage divider.

The power settings conventionally provide for motor speeds from zero to a maximum forward amount in a direction of motor rotation corresponding to forward movement of the vehicle. In addition, according to the invention, the power settings provide for motor speeds in substantially or, preferably, identically the same range in a direction of motor rotation corresponding to reverse movement of the vehicle. Structural implementation of the additional range of reverse motor speeds may be entirely conventional so that further detail is omitted as not being particularly pertinent to the invention.

The preferred embodiment of the truck employs electric motors 16 at each wheel. Differential action required for turning may be accomplished by appropriately varying the rotational speed of inner and outer wheels, this variation being provided as an adjustment to the voltage or current provided to the respective motors.

Turning to FIGS. 4A and 4B, the truck 10 is preferably provided with a dump bed 20 that may be raised from either end 22a, 22b of the truck. This is accomplished by providing extendable rams 24a, 24b anchored to the truck chassis 11 at each end 22a,b of the truck, the rams being operably connected to respective ends 20a, 20b of the dump bed 20, for raising and lowering the ends 20a, 20b. A control device (not shown) ensures that only one of the rams corresponding to one of the ends 20a, 20b of the dump bed is extended at a time, the opposite ram being retracted during this extension so that the dump bed is pivoted about the opposite end of the truck.

To provide for this pivoting, the truck chassis 11 at each end 22a,b of the truck are provided with a bearing 28a having a concave circular arc, while each end 20a, 20b of the dump bed includes a corresponding bearing 28b having a convex circular arc for receipt by the bearing 28a. The arc lengths and dispositions of the bearings 28 are such as to permit the dump bed to rise out of the bearing when the dump bed is being lifted by the corresponding ram, while the bearing is suitable to pivotally retain the dump bed when the dump bed is being lifted by the opposite ram.

With respect to the longitudinal dimension of the dump bed, the rams 24a,b may be connected to a shaft 29 extending between the bearings 28b corresponding to each side thereof as shown in FIGS. 4A and 4B; however, other locations for attachment may be employed with equal facility. With respect to the lateral dimension of the dump bed and where a single ram is employed at each end thereof, the rams should be connected to the dump bed so that they are centered on the dump bed to maintain lateral stability of the dump bed when it is fully loaded. Preferably, there are at least four sets of the bearings 28a,b, whereas only two sets are visible in FIGS. 4A and 4B; however, the number of bearings may be adjusted as desired or needed for bearing the design weight of the loaded dump bed.

The bi-directional dumping feature provides an additional degree of freedom to facilitate dumping; for example, the truck may travel from point A where it has been loaded either forwardly to a point B for dumping, or backwardly to a point C for dumping, and dump the load without turning around. Otherwise, the truck would have to be turned around each time a decision to move to a different one of the points A and C was made, and this is true even with the bi-directional movement provided by the transmission 18. Where the truck only moves between points A and B, or only moves between points A and C, the bi-directional dumping feature may still be advantageous to prevent having to turn the truck around more than once.

Other features of an autonomous truck may be symmetric to provide additional advantages in controlling the vehicle to move forwardly or reversedly with substantially equal facility or to provide substantially the same drive characteristics. One example of this is to use the electrical transmission 18 for driving an electric motor at an equal number of front and rear wheels, and another would be to form the dump bed symmetrically about the center of the wheelbase "w" (FIG. 4) and also to center it over this wheelbase to provide substantially equal weight distribution over the front and rear wheels of the truck.

It is to be recognized that, while a particular bi-directional autonomous truck has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. An autonomous truck having a longitudinal axis defining a first truck end and a second truck end, comprising a truck chassis and a dump bed supported by said truck chassis, said truck chassis having a first lifting mechanism and a first bearing connected to the first truck end and a second lifting mechanism and a second bearing connected to the second truck end, said first lifting mechanism being coupled to a first dump-bed end of the dump bed and said second lifting mechanism being coupled to a second dump-bed end of the dump bed, wherein the first bearing is adapted to receive and pivotally retain said dump bed when said dump bed is being lifted by the second lifting mechanism, and to release said dump bed when said dump bed is being lifted by the first lifting mechanism, and wherein the second bearing is adapted to receive and pivotally retain said dump bed when said dump bed is being lifted by the first lifting mechanism, and to release said dump bed when said dump bed is being lifted by the second lifting mechanism.

2. The autonomous truck of claim 1, wherein said chassis includes a drive train including a first set of wheels and a second set of wheels corresponding to the first truck end and the second truck end, and wherein said dump bed is substantially symmetric about a plane that is perpendicular to said longitudinal axis and centered between said first set of wheels and said second set of wheels.

3. The autonomous truck of claim 2, further comprising a first power source;
   wherein said first set of wheels is spaced apart from said second set of wheels along said axis;
   said first set of wheels includes a first wheel and a second wheel;
   said rear set of wheels includes a third wheel and a fourth wheel; and
   said drive-train further includes one of (a) a mechanical transmission for transmitting rotational motion of said first power source to said first wheel, said mechanical transmission including a plurality of forward gears and a plurality of reverse gears, and (b) an electrical control system for distributing electrical current to said power source, said first power source being mechanically coupled to said first wheel, said electrical control system being adapted so that a maximum rotational speed of said power source is substantially the same for both clockwise and counterclockwise rotation thereof.

4. The autonomous truck of claim 3, wherein said drive-train includes said electrical control system.

5. The autonomous truck of claim 4, further comprising a second power source mechanically coupled to said third wheel, said electrical control system being adapted so that a maximum rotational speed of said second power source is substantially the same for both clockwise and counterclockwise rotation thereof.

6. The autonomous truck of claim 5, wherein said maximum rotational speeds of said first and second power sources are substantially the same.

7. The autonomous truck of claim 5, further comprising a third power source mechanically coupled to said second wheel and a fourth power source mechanically coupled to said fourth wheel, said electrical control system being adapted so that a maximum rotational speed of said third and fourth power sources is substantially the same for both clockwise and counterclockwise rotation thereof.

8. The autonomous truck of claim 7, wherein said maximum rotational speeds of said first, second, third and fourth power sources are substantially the same.

* * * * *